United States Patent
Burgess et al.

(10) Patent No.: US 8,146,411 B2
(45) Date of Patent: Apr. 3, 2012

(54) SIMULATING ROTATION OF A WHEEL

(75) Inventors: Craig L. Burgess, Watauga, TX (US);
Joy Green, Benbrook, TX (US);
Stephen Kissling, Palmdale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 166 days.

(21) Appl. No.: 12/727,281

(22) Filed: Mar. 19, 2010

(65) Prior Publication Data
US 2011/0226049 A1  Sep. 22, 2011

(51) Int. Cl.
*G01M 17/013* (2006.01)
(52) U.S. Cl. ............... 73/118.01; 73/115.07; 73/118.03
(58) Field of Classification Search ............ 73/115.07, 73/115.08, 118.01, 118.03, 128, 130
See application file for complete search history.

(56) References Cited

U.S. PATENT DOCUMENTS

| | | | | |
|---|---|---|---|---|
| 4,062,234 A | * | 12/1977 | Bartlett et al. | 73/862.11 |
| 4,669,318 A | * | 6/1987 | Angstrom | 73/862.09 |
| 5,005,405 A | | 4/1991 | Ishizeki | |
| 5,020,861 A | | 6/1991 | Gorges et al. | |
| 5,323,644 A | * | 6/1994 | Schaefer | 73/118.01 |
| 5,594,173 A | | 1/1997 | Frey et al. | |
| 6,425,282 B2 | | 7/2002 | Vaughn | |
| 6,837,553 B2 | | 1/2005 | Beck et al. | |
| 7,104,118 B2 | * | 9/2006 | Tentrup et al. | 73/116.06 |
| 7,194,398 B2 | * | 3/2007 | Abe | 703/8 |
| 7,489,996 B2 | | 2/2009 | Gowan et al. | |
| 7,743,650 B2 | * | 6/2010 | Engstrom | 73/114.68 |
| 8,001,835 B2 | * | 8/2011 | Engstrom | 73/116.06 |
| 8,032,272 B2 | * | 10/2011 | Dulac | 701/29 |
| 2009/0126510 A1 | * | 5/2009 | Engstrom | 73/862.14 |

* cited by examiner

*Primary Examiner* — Freddie Kirkland, III
(74) *Attorney, Agent, or Firm* — Reising Ethington P.C.; John J. Snyder

(57) ABSTRACT

A device and method for simulating rotation of a wheel on a vehicle having a rotatable wheel rotation sensor. A motor is coupled to a rotatable portion of the rotation sensor, and is operated to rotate the rotatable portion of the rotation sensor according to a pulse train simulating a wheel skid.

19 Claims, 7 Drawing Sheets

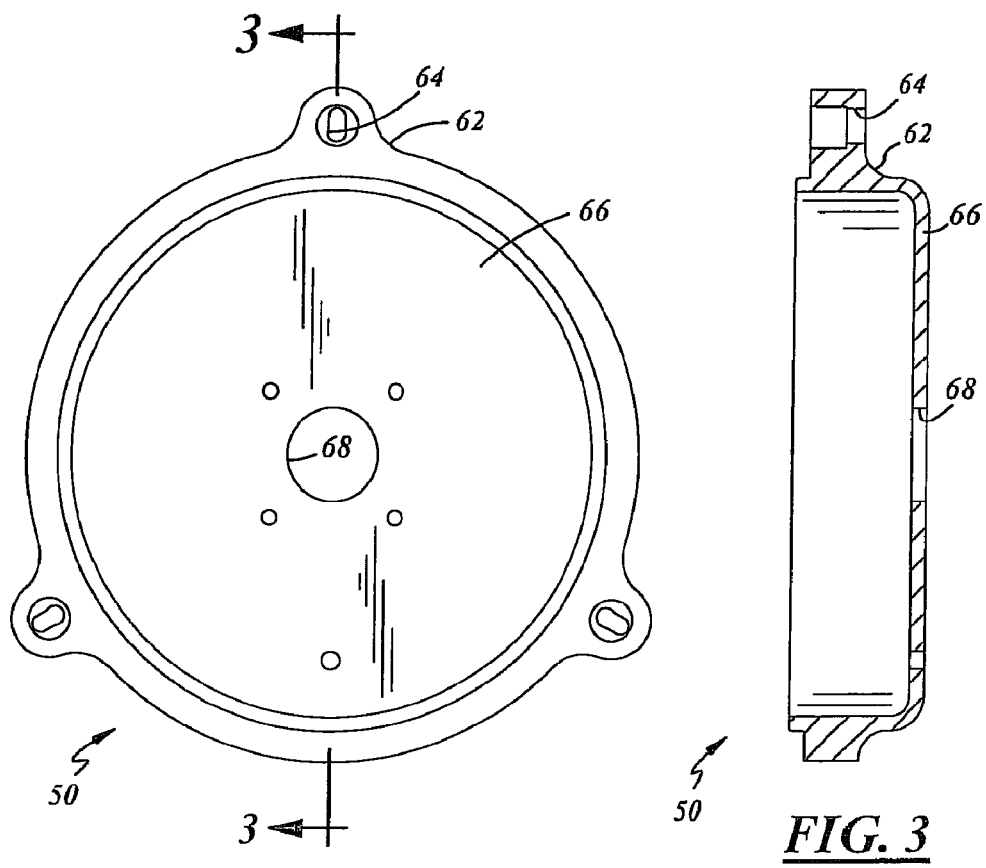
FIG. 2
FIG. 3
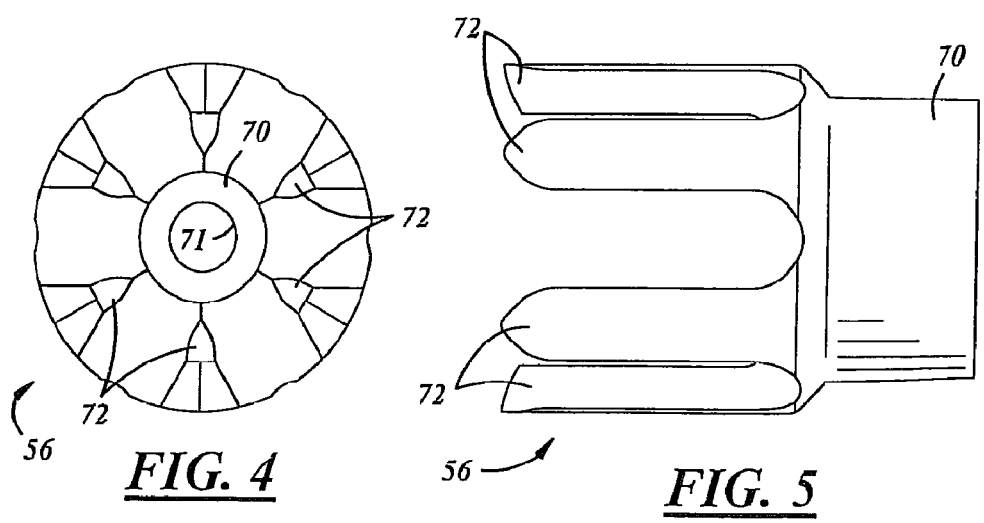
FIG. 4
FIG. 5

SIMULATING ROTATION OF A WHEEL

STATEMENT REGARDING FEDERALLY SPONSORED RESEARCH OR DEVELOPMENT

This invention was made with U.S. Government support under Contract Number N00019-02-C-3002. The U.S. Government has certain rights in this invention.

CROSS-REFERENCES TO RELATED APPLICATIONS

Not Applicable.

BACKGROUND

1. Technical Field

This invention relates generally to a method and apparatus to simulate rotation of a vehicle wheel to facilitate vehicle testing.

2. Description of the Related Art Including Information Disclosed Under 37 CFR 1.97 and 1.98

Testing of various types of vehicle systems sometimes involves simulating rotation of a vehicle wheel. For example, U.S. Pat. No. 5,594,173 to Frey discloses a test device configured to stimulate a wheel speed sensor of an automotive vehicle. The test device includes a wheel rotation simulator that includes a magnetic coil, and a control unit that applies AC voltage to energize the coil to magnetically stimulate the vehicle's wheel speed sensor to sense a simulated wheel speed. Frey discloses the use of the simulated wheel speed input in carrying out functional tests of such vehicle systems as cruise control and speed-sensitive windscreen wipers. Also, Frey teaches that functional tests of brake control systems necessitate actual wheel rotation. Frey therefore discloses a transportable roller unit that supports and actually rotates a vehicle wheel at speeds necessary to provide a wheel speed input necessary to test a vehicle brake system.

U.S. Pat. No. 5,005,405 to Ishizeki discloses a method of testing a vehicle's anti-lock brake control system. The method includes mounting such a vehicle on a test stand having rollers that support and impart rotational motion to the vehicle's wheels. The test stand also includes a dynamometer that measures braking force.

U.S. Pat. No. 6,425,282 to Vaughn discloses a portable test device for a rail car air brake system. The test device includes ports connectable to a source of pressurized air and to a brake pipe connector, valves that selectively interconnect the ports to each other and to the atmosphere as necessary to perform tests, a sensor that measures pressure at a brake pipe port of the test device, a controller coupled to the valves and sensor, a housing, an input device, and a display.

U.S. Pat. No. 7,489,996 to Gowan discloses an aircraft wheel anti-skid system including wheel speed transducers that provide wheel speed data to axle-mounted antiskid units. The system also includes radio frequency data ports that download wheel speed data from the antiskid units, a transmitting antenna disposed at the axle, and a receiving antenna disposed at a wheel of the aircraft. A laptop computer can be interfaced with the data port to download data.

U.S. Pat. No. 6,837,553 to Beck discloses an aircraft anti-skid brake control system, an aircraft nose wheel steering control system, and a built-in test system. The built-in test system includes a field programmable gate array (FPGA) that executes system algorithms. The built-in test system also includes a wheel speed interface that's interposed between the FPGA and wheel speed transducers and presents simulated wheel speed signals to the FPGA for use in testing the anti-skid and nose wheel steering systems.

U.S. Pat. No. 5,020,861 to Gorges discloses a cap that attaches to an aircraft wheel in a position covering a hub of the wheel. An inside surface of the cap includes a means for engaging a hub-mounted antiskid system wheel speed transducer in such a manner that rotation of the wheel and cap is transmitted to the transducer. The cap is disposed relative to the wheel hub such that an airflow passageway is formed between the transducer and a sidewall of the cap.

BRIEF SUMMARY

A test device is provided to simulate rotation of a wheel on a vehicle having a rotatable wheel rotation sensor. The test device includes a motor coupleable to a rotatable portion of the rotation sensor, and a motion controller in communication with the motor to operate the motor to rotate the rotatable portion of the rotation sensor according to a pulse train simulating a wheel skid. The controller also may operate the motor according to a velocity mode to simulate wheel speed.

Also provided is a method of simulating rotation of a wheel on a vehicle having a rotatable wheel rotation sensor. The method includes coupling a motor to a rotatable portion of the rotation sensor, and operating the motor to rotate the rotatable portion of the rotation sensor according to a pulse train simulating a wheel skid. The method also may include operating the motor according to a velocity mode to simulate wheel speed.

Further provided is a method of simulating rotation of wheels on a vehicle having rotatable wheel rotation sensors. The method includes coupling motors to rotatable portions of the rotation sensors, operating at least one of the motors to rotate at least one of the rotatable portions of at least one of the rotation sensors according to a velocity mode, and operating another of the motors to rotate another of the rotatable portions of another of the rotation sensors according to a pulse train simulating a single wheel skid.

Additionally provided is a method of testing vehicle system functionality. The method includes coupling a motor to a rotatable portion of a vehicle wheel rotation sensor, operating the motor to rotate the rotatable portion of the rotation sensor according to a pulse train simulating a wheel skid, and sensing wheel rotation using the rotation sensor of the vehicle.

BRIEF DESCRIPTION OF THE SEVERAL VIEWS OF THE DRAWINGS

These and other features and advantages will become apparent to those skilled in the art in connection with the following detailed description and drawings of one or more embodiments of the invention, in which:

FIG. 2 is a rear view of an example embodiment of a hubcap adapter of the test device of FIG. 1;

FIG. 3 is a cross-sectional view taken through line 3-3 of the hubcap adapter of FIG. 2;

FIG. 4 is a front view of a drive coupling of the test device of FIG. 1;

FIG. 5 is a side view of the drive coupling of FIG. 4;

DETAILED DESCRIPTION

Figure 1:
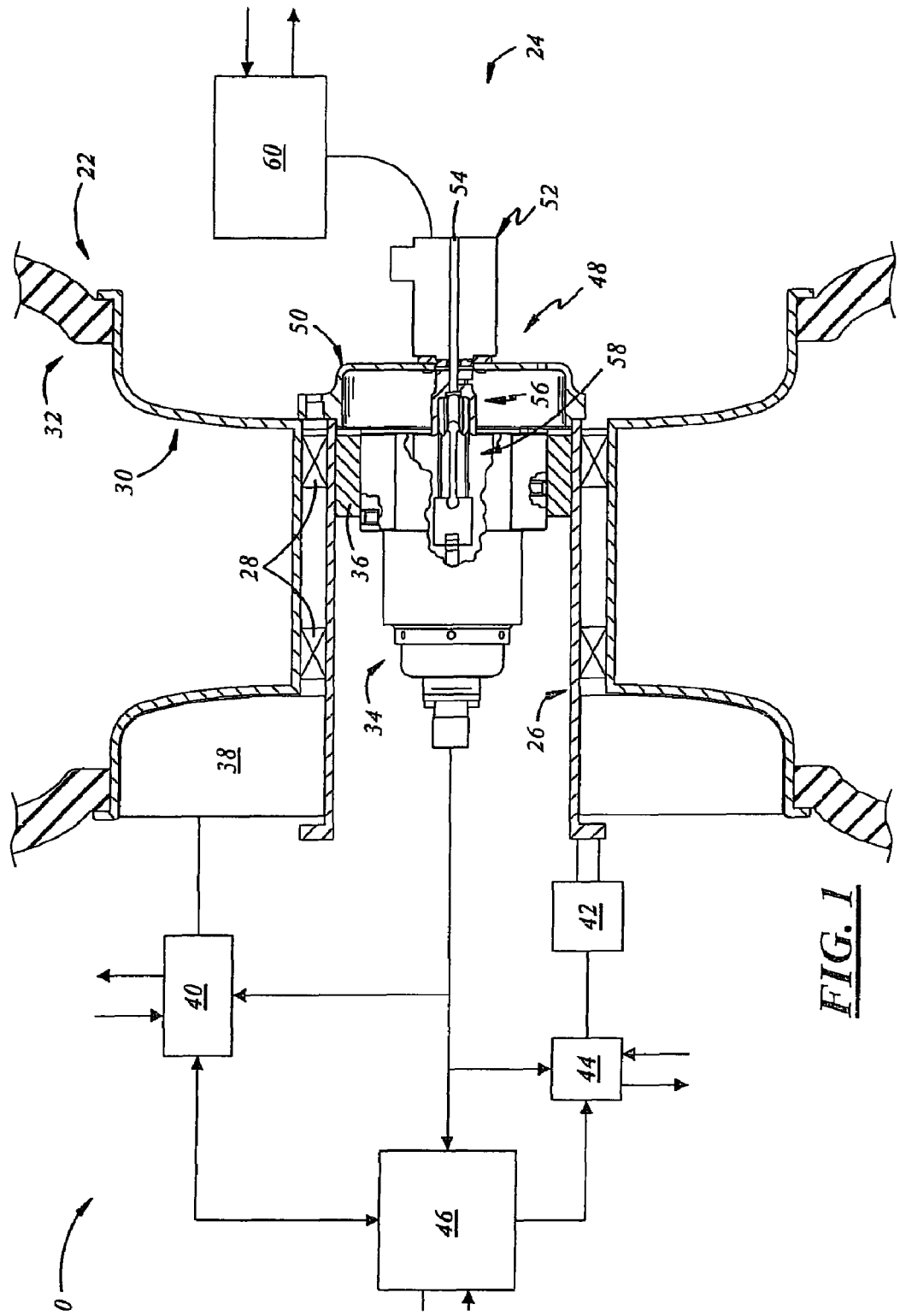
FIG. 1 is a fragmentary schematic view of a portion of a vehicle and an example embodiment of a test device that simulates rotation of a wheel on the vehicle.

FIG. 1 illustrates a portion of a vehicle 20 including a wheel 22, and a test device 24 that rotates a rotatable portion 58 of a wheel rotation sensor 34 at speeds to simulate rotation of the wheel 22 whether or not the wheel 22 is actually rotating. The simulated rotation may be used for testing of wheel braking or steering controls, or the like. As will be discussed in detail below, the test device 24 may operate according to two modes. One mode is a pulse mode to realistically simulate a skid condition for any suitable purpose including testing of anti-skid controls of the vehicle 20. The other mode is a velocity mode to simulate vehicle motion or wheel rotation for any suitable purpose including testing of a vehicle maintenance mode, speed-sensitive steering, or, where the vehicle is an aircraft, for testing the response of a vehicle braking system to brake application during a simulated rejected take-off.

As used herein, the term "vehicle" includes an aircraft, an automobile, a truck, a train, or any other transportation apparatus having one or more road wheels. In the exemplary embodiment discussed below, the vehicle 20 is an aircraft having road wheels on landing gear assemblies. Although only one wheel 22 is illustrated, those of ordinary skill in the art will understand that the vehicle 20 may include one or more additional wheels. For example, in the example aircraft embodiment, the vehicle 20 may include left and right main landing gear wheels and a front landing gear or nose gear wheel (not shown). Although, the test device 24 is particularly suitable for use with high-performance military aircraft, the test device 24 and related method are also applicable to other types of aircraft and vehicles.

As shown in FIG. 1, the vehicle 20 includes a wheel support or axle 26, bearings 28 to support the wheel 22 for rotation on the axle 26. Also, the wheel 22 includes a rim 30 and a tire 32 mounted to the rim 30. The vehicle 20 also includes the wheel speed or rotation sensor 34 that may be supported by a bushing 36 in the axle 26, and that is ordinarily coupled to a wheel hub cap (not shown) that is connected to the wheel 22 so that wheel rotation is imparted to the sensor 34. Also, the vehicle 20 may include a braking system, which may include a braking apparatus 38 to slow rotation of the wheel 22 and a braking controller 40 to control the braking apparatus 38. The vehicle 20 also may include a steering system, which may include a steering apparatus 42 to turn the wheel 22 and a steering controller 44 to control the steering apparatus 42. Additionally, the vehicle 20 may include a vehicle controller 46 in communication with the braking and steering controllers 40, 44 to supervise braking and steering and/or various other vehicle functions.

The braking apparatus 38 may include disc brakes, clutch brakes, or any other suitable type of brakes, and may be electrically controlled, hydraulically controlled, or controlled in any other suitable manner. Although not separately shown, the braking apparatus 38 may include various sensors, actuators, and other suitable devices to carry out vehicle braking. The braking controller 40 may receive input from the vehicle controller 46, the wheel rotation sensor 34, and any other vehicle device(s), and then process that input in light of stored instructions and/or data, and then transmit output signals to the braking apparatus 38, the vehicle controller 46, and/or any other suitable vehicle device(s).

Those of ordinary skill in the art will recognize that the vehicle 20 may include anti-skid braking functionality to apply maximum brake force while avoiding tire skidding. In a specific example, the braking apparatus 38 and the braking controller 40 may include any suitable anti-skid controls hardware, firmware, and software to control the vehicle 20 in a manner to reduce or prevent vehicle skidding. Likewise, the braking apparatus 38 and controller 40 may also include any suitable anti-skid testing hardware, firmware, and software to test the anti-skid functionality of the vehicle 20.

The steering apparatus 42 may include a geared device, a ball screw device, or any other suitable type of steering mechanism, and may be electrically controlled, hydraulically controlled, or controlled in any other suitable manner. Although not separately shown, the steering apparatus 42 may include various sensors, actuators, and other suitable devices to carry out vehicle steering. The steering controller 44 may receive input from the vehicle controller 46, the wheel rotation sensor 34, and/or any other suitable vehicle device(s), and then process that input in light of stored instructions and/or data, and then transmit output signals to the steering apparatus 42, the vehicle controller 46, and/or any other suitable vehicle device(s).

Those of ordinary skill in the art will recognize that the vehicle 20 may include speed-sensitive steering functionality to reduce steering angle as a function of increased ground or wheel speeds, and vice versa. In a specific example, the steering apparatus 42 and controller 44 may include any suitable speed-sensitive wheel steering controls hardware, firmware, and software to steer the vehicle 20 as a function of speed. Likewise, the steering apparatus 42 and controller 44 may also include any suitable testing hardware, firmware, and software to test the speed-sensitive steering functionality of the vehicle 20.

The vehicle controller 46 may receive input from the braking and steering controllers 40, 44, various vehicle sensors and devices, and process that input in light of stored instructions and/or data, and then transmit output signals to the braking and steering controllers 40, 44, and/or any other suitable vehicle device(s). Those of ordinary skill in the art will recognize that the controllers need not be separate controllers and could be integrated into two or even one controller.

The controllers 40, 44, 46 individually or collectively may include, for example, one or more electrical circuits, electronic circuits or chips, and/or computing devices. In the computing device embodiment, the controllers 40, 44, 46 generally may include one or more processors, memory that may be coupled to the processors, and interfaces coupling the controllers 40, 44, 46 to one or more other devices. Although not shown, the controllers 40, 44, 46 and other powered devices may be supplied with electricity by a power supply, for example, one or more batteries, fuel cells, or the like.

The processors may execute instructions that provide at least some of the functionality for the braking and steering apparatuses 38, 42 and controllers 40, 44. As used herein, the term instructions may include, for example, control logic, computer software and/or firmware, programmable instructions, or other suitable instructions. The processors may include, for example, one or more microprocessors, microcontrollers, application specific integrated circuits, programmable logic devices, and/or any other suitable type of processing device.

The memory may be configured to provide storage for data received by or loaded to the controllers, and/or for processor-executable instructions. The data and/or instructions may be stored, for example, as look-up tables, formulas, algorithms, maps, models, and/or any other suitable format. The memory may include, for example, RAM, ROM, EPROM, and/or any other suitable type of storage device.

The interfaces may include, for example, analog/digital or digital/analog converters, signal conditioners, amplifiers, filters, other electronic devices or software modules, and/or any other suitable interfaces. The interfaces may conform to, for example, RS-232, parallel, small computer system interface, universal serial bus, CAN, MOST, LIN, FlexRay, and/or any other suitable protocol(s). The interfaces may include circuits, software, firmware, and/or any other devices to assist or enable the controllers 40, 44, 46 in communicating with other devices.

Still referring to FIG. 1, the test device 24 includes a vehicle coupling assembly 48, which may include a hubcap adapter 50 mountable to the vehicle wheel 22, and includes a motor 52 coupleable to a rotatable portion 58 of the wheel rotation sensor 34. For example, the motor 52 may be coupled to the adapter 50 and may have an output shaft 54, wherein a drive coupling 56 of the test device 24 may be coupled to the end of the output shaft 54 and may be connectable to the rotatable portion 58 of the wheel rotation sensor 34 when the adapter 50 is mounted to the vehicle wheel 22. The illustrated embodiment includes a direct drive connection between the motor 52 and the drive coupling 56, but any other arrangement may be used including one or more gears, belts, or other devices between the motor 52 and coupling 56 in any suitable manner. The test device 24 also includes motion controls 60 in communication with the motor 52 to operate the motor 52 to rotate the rotatable portion 58 of the rotation sensor 34 via the motor output shaft 54 and the drive coupling 56.

Referring now to FIGS. 2 and 3, the hubcap adapter 50 may include, according to an example embodiment, an annular flange 62 with fastener holes 64 for coupling to the wheel 22 (FIG. 1), a web 66, and an aperture 68 through the web 66. The hubcap adapter 50 may be composed of aluminum, steel, or any other suitable material and may be cast, machined, formed, or produced in any suitable manner.

As shown in FIGS. 4 and 5, the drive coupling 56 may include, according to an example embodiment, a central portion 70 having a bore 71 for coupling to the output shaft 54 of the motor 52, and a plurality of fingers 72 for coupling to the rotation sensor 34 (FIG. 1). The drive coupling 56 may be composed of aluminum, steel, or any other suitable material, and may be cast, machined, formed, or produced in any suitable manner.

Figures 6, 7:
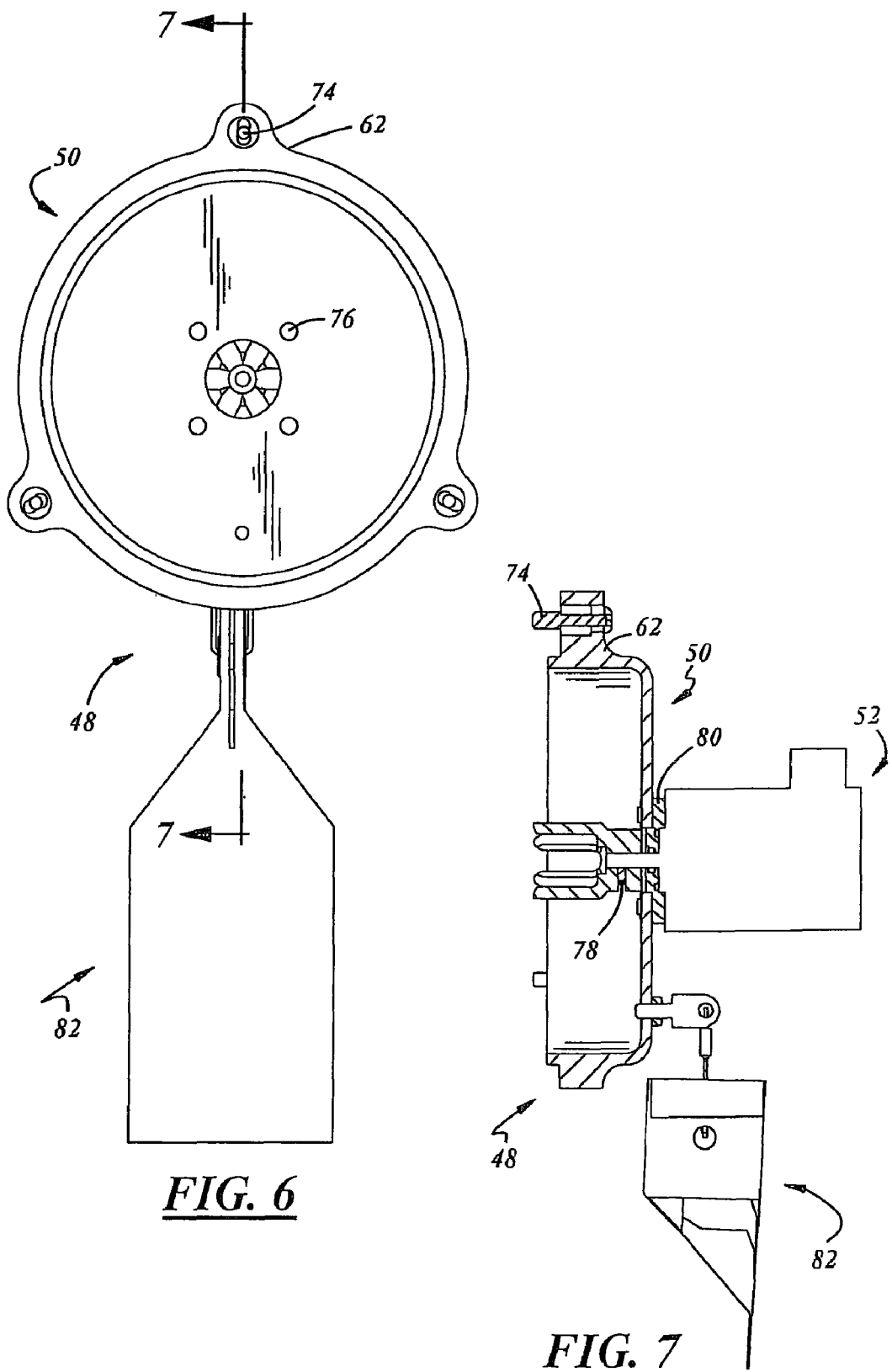
FIG. 6 is a rear view of a vehicle coupling of the test device of FIG. 1.
FIG. 7 is a cross-sectional view taken through line 7-7 of the vehicle coupling of FIG. 6.

With reference to FIGS. 6 and 7, the vehicle coupling assembly 48 may also include any suitable fasteners 74, for instance captive screws, through the flange 62 of the hubcap adapter 50, and the motor 52 may be coupled to the hubcap adapter 50 by any suitable fasteners 76. The motor output shaft 54 may extend through the aperture 68 of the adapter 50 for coupling to the drive coupling 56, for example, by a set screw 78. A shaft seal 80 may be interposed between the output shaft 54 and the adapter 50 and, although not shown, O-rings may be used as well for good sealing of the motor 52. Also, the assembly 48 may include a Remove Before Flight streamer coupled to the adapter 50.

Figure 8:
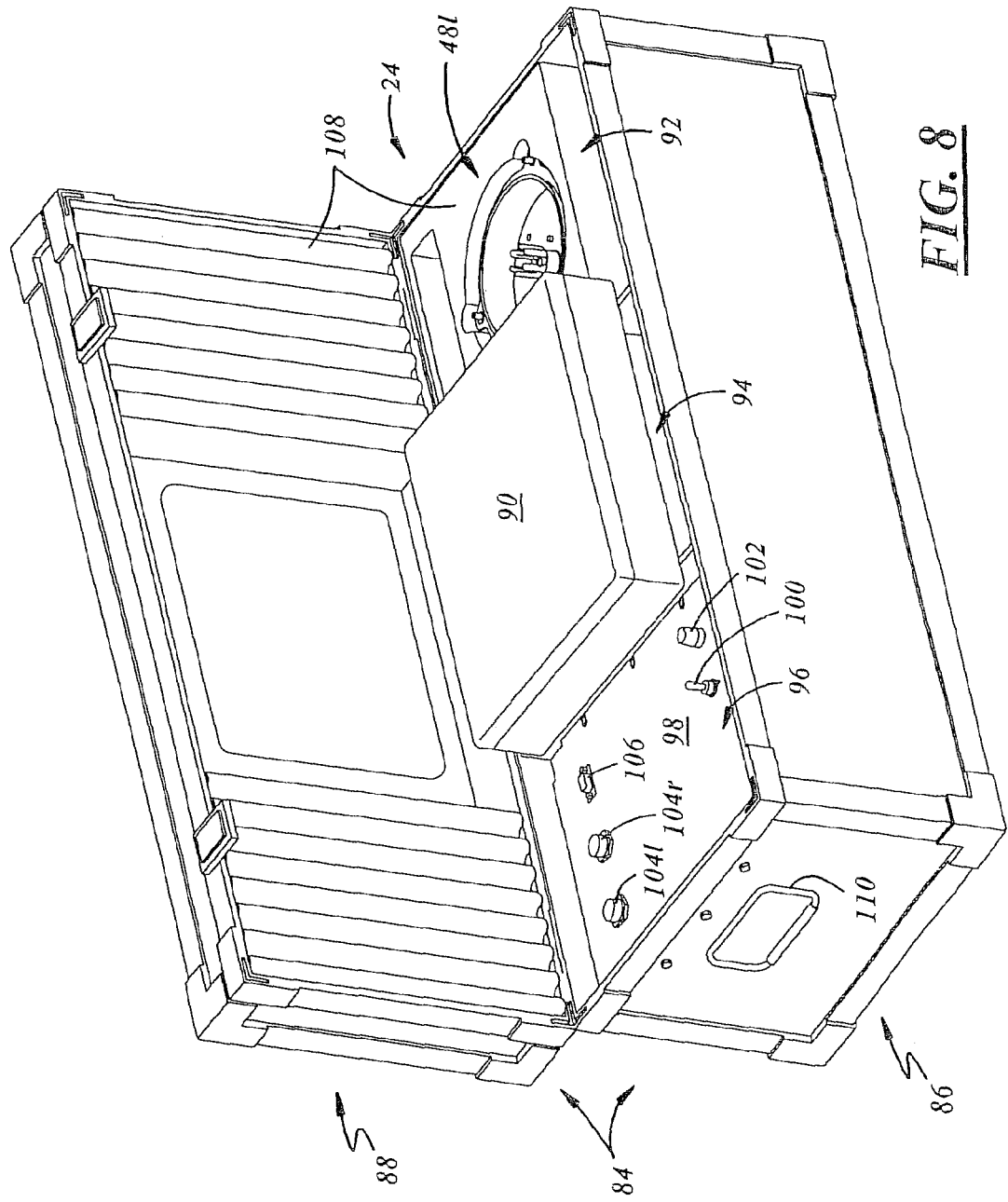
FIG. 8 is a perspective view of the test device of FIG. 1, including a protective housing and a computer.

FIG. 8 illustrates the test device 24 as embodied in a protective housing 84 including a case 86, and a cover 88 that may be hinged and latchable to the case 86. The housing 84 may be a SPACECASE brand product available from Melmat Inc. of Huntington, Calif., or any other suitable housing. As shown, the test device 24 also may include a computer 90 and, although not shown, any suitable spare battery and/or battery charger may be carried in the housing 84. The test device 24 may include a first compartment 92 in the housing 84 for a first vehicle coupling assembly 48*l*, a second compartment 94 in the housing 84 for a second vehicle coupling assembly (not shown), and a third compartment 96 in the housing 84 for motion controller electrical and electronic componentry. The third compartment 96 may include an interface panel 98 that may include an on/off switch 100, a fuse 102, motor communication couplings 104*l*, 104*r*, and a communication coupling 106 for the computer 90. The test device 24 also may include any suitable power and/or communication cables (not shown), which may be carried in the housing 84. The housing 84 may include any suitable foam 108 and/or other structure to protect the various devices and components, and may include handles 110 (one shown). Accordingly, the test device 24 may be a self-contained kit that is mobile and manually transportable by one or more people.

Figure 9:
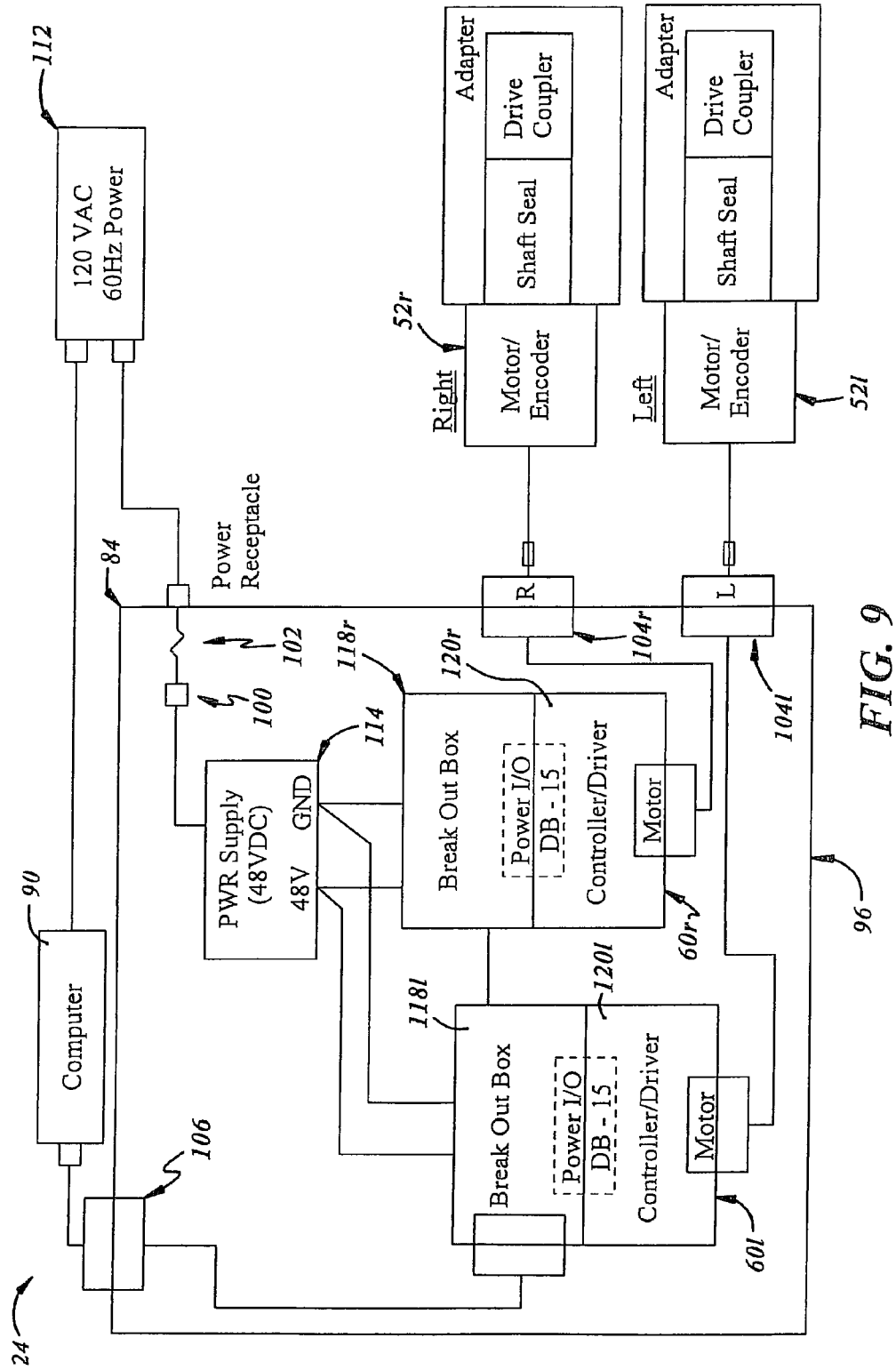
FIG. 9 is a block diagram of the test device of FIG. 1.

FIG. 9 illustrates an example electrical schematic for the test device 24, including left and right motion controls 60*l*, 60*r* in the housing 84, left and right motors 52*l*, 52*r*, and the computer 90. The housing 84 and the computer 90 may be powered with a power source 112, which may include, for example, 120 Volt AC at 60 Hz via utility power, generator power, or the like. In turn, the motion controls 60*l*, 60*r* may be powered by a transformer 114, which may include a 48 Volt AC/DC step down transformer, which may be coupled to the power source 112 by the switch 100 and the fuse 102, for instance, a three amp fuse. The transformer 114 may be a VICOR brand device available from Vicor, Inc. of Andover, Mass. The controls 60*l*, 60*r* may include communication break out boxes 118*l*, 118*r* coupled upstream to the computer port 106 and to the transformer 114 and coupled downstream to motor drivers 120*l*, 120*r*, which are coupled to the motors 52*l*, 52*r* via the motor ports 104*l*, 104*r*. The motor drivers 120*l*, 120*r*, break out boxes 118*l*, 118*r*, power supply 114, motors 52*l*, 52*r*, and various power and communication cabling may be QUICKSILVER brand products available from QuickSilver, Inc. of Covina, Calif. The motors 52*l*, 52*r* may be brushless DC stepper motors, may be sealed, and may have permanently attached cables. Those of ordinary skill in the art will recognize that the size, power, and other parameters of such components are application specific, and any suitable components may be used.

In one embodiment, the computer 90 may be a GoBook III laptop computer and may be loaded with any suitable operating system and QUICKSILVER brand application software. An executable file, for example, a VISUALBASIC motion controller executable file could be loaded to the computer 90 with user specific parameters set up, for instance, motor characteristics like direction of rotation, acceleration rates, velocity mode (spinning at RPM), pulse mode, and other device settings to direct the drivers 120*l*, 120*r* to interact with the motors 52*l*, 52*r*. Therefore, the computer 90 may provide a user interface for the test device 24 to allow the user to input commands and vary the motion control parameters, and to receive feedback like indicated wheel speed, or status for running in pulse mode or velocity mode.

Figure 10:
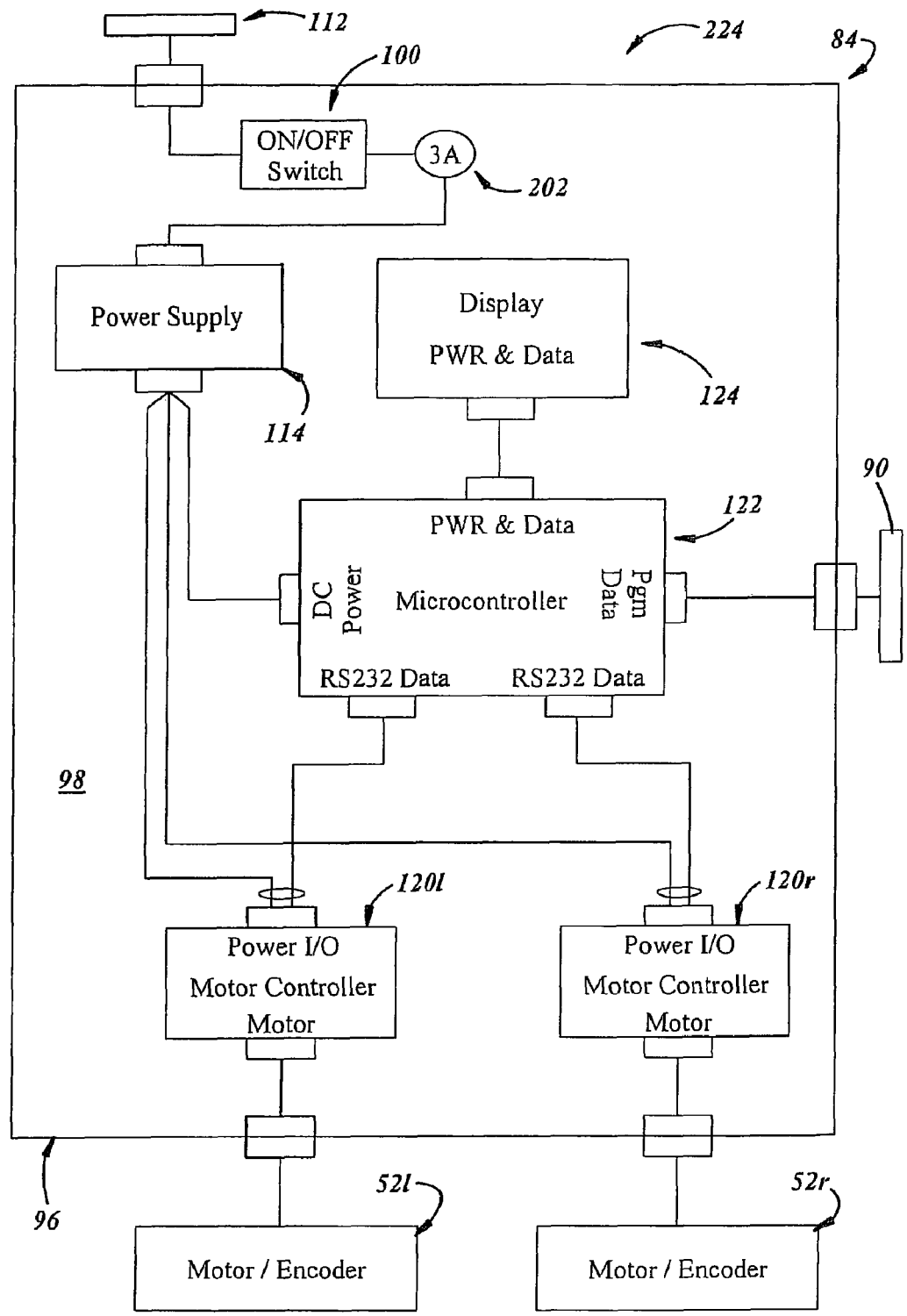
FIG. 10 is a block diagram of another embodiment of the test device of FIG. 1.

Referring now to FIG. 10, another embodiment of a test device 224 may include, instead of the computer 90, a computing device 122, and a user interface 124 that may be integrated in the third compartment 96 of the housing 84. For example, the user interface 124 may be mounted on the panel 98 and, although not separately shown, may include a liquid crystal display and soft keys on either side of the display to allow a user to select pulse mode or velocity mode and to select parameters and values desired for any given test. The test device 224 may include a circuit breaker 202 instead of a fuse. The user interface 124 may be a BEKA brand device, model BA488C available from Beka Associates Limited of Hitchin, UK, or may be any other suitable interface. Also, the computing device 122 may include a microcontroller to host the application software and executable files and, although not separately shown, may include a suitable processor and programmable flash EEPROM that may be programmed using the computer 90 or any other suitable computer or the like. In a particular example, the computing device 122 may include a PC/104 type of device or its progeny, and may be a PARVUS brand device available from Parvus Corporation of Salt Lake City, Utah. In any event, the computing device 122 may have the motion control software application loaded thereto as well as the executable file.

In operation, the motors 52l, 52r may be driven according to the velocity mode to simulate fixed or variable wheel speed, and/or the pulse mode to simulate wheel skidding. The velocity mode may be used for any vehicle testing that uses fixed or variable wheel speed. For example, the test device 24 can rotate the wheel rotation sensor 34 from zero RPM up to about 2,000 RPM (or roughly equivalent to 180 knots ground speed) and at an accuracy of about +/−3%. The pulse mode may be used for any vehicle testing that uses simulated skids or partial loss of traction, for instance, for testing of anti-skid braking of aircraft. In either mode, the motors 52l, 52r may be driven independently, individually, simultaneously, or the like, and according to the same or different speeds and/or pulse commands.

In one example of velocity mode, the motion controllers 60l, 60r can drive one or both of the motors 52l, 52r in a fixed or variable manner, while testing of a maintenance mode of an aircraft is carried out. Wheel speed is used as an input to transitioning in and out of an aircraft maintenance mode wherein the aircraft's electrical system is locked out while the aircraft is undergoing ground maintenance. In actual use, the braking controller 40 provides a stopped or not-stopped signal to the vehicle controller 46 as an input for transitioning into and out of the maintenance mode. According to conventional functional testing of the maintenance mode, a simulated wheel speed signal is introduced to the vehicle controller 46 downstream of the braking controller 40. However, the presently disclosed test device 24 allows the wheel rotation sensor 34 and braking controller 40 to be included in the functional testing, which may be carried out by the braking and/or vehicle controllers 40, 46 in any suitable manner.

In another example of velocity mode, the motion controllers 60l, 60r can drive one or both of the motors 52l, 52r in a fixed or variable manner, while testing of speed-sensitive aircraft nose wheel steering is carried out. In this example, wheel speed is an input to determine wheel steering gain. In actual use, and at low groundspeeds, full nosewheel deflection for steering is available with full rudder pedal commands. But at high ground speeds, gain scheduling reduces nosewheel steering angle for a given command input. According to conventional functional testing of speed-sensitive steering controls, a simulated wheel speed signal is introduced to the vehicle controller 46 downstream of the steering controller 44. However, the presently disclosed test device 24 allows the wheel rotation sensor 34 and steering controller 44 to be included in the functional testing, which may be carried out by the steering and/or vehicle controllers 44, 46 in any suitable manner.

In a further example of velocity mode, the motion controllers 60l, 60r can drive one or both of the motors 52l, 52r in any suitable manner, while testing the braking system response to brake application during a simulated rejected take off. In this example, a relatively high wheel speed, for instance about 2,000 RPM, is used as an input to simulate wheel speed at or near an aircraft take off speed. According to conventional functional testing of brake systems for rejected take offs, a simulated wheel speed signal is introduced to the vehicle controller 46 downstream of the steering controller 44. However, the presently disclosed test device allows the wheel rotation sensor 34 and braking controller 40 to be included in the functional testing, which may be carried out by the braking or vehicle controllers 40, 46 in any suitable manner.

In one example of the pulse mode, the motion controllers 60l, 60r can deliver voltage across and/or current through the motors 52l, 52r according to a pulse train or square wave to pulse the motors 52l, 52r between an on and off condition or between a lower speed and a higher speed. In this example, abrupt changes in wheel speed may be used as an input to the braking controller 40 to determine whether the changes are indicative of a wheel skid. In actual use, if a skid condition is detected, the braking controller 40 can decrease brake application via the braking apparatus 38 to decrease brake torque and allow the tire of the wheel 22 to maintain effective rolling friction with a runway surface rather than skidding. According to conventional functional testing of anti-skid controls, only individual portions of the braking system are tested, or the entire system is tested under steady-state conditions without realistic skid indications. However, the presently disclosed test device 24 allows the wheel rotation sensor 34 and braking controller 40 to be included in the functional testing, which may be carried out by the braking or vehicle controllers 40, 46 in any suitable manner. Accordingly, the test device 24 provides realistic stimuli for brake anti-skid functional testing.

More specifically, the pulse mode may be used to simulate a wheel skid and may include a pulse train that may be defined by or generated in response to at least one of the following wheel skid parameters: skid speed reduction, skid frequency, skid duration, or skid persistence. The parameters may be available in the motion control software and may be selectable by a user of the device. Likewise, values, ranges of values, and/or the like also may be input by a user into the device, for instance, via the computer 90, the user interface 124, or any other suitable device. Such data may be stored in suitable computer or computing device memory in a spreadsheet, look up table, database, or any suitable format. Wheel rotation direction is clockwise for a right wheel, counter-clockwise for a left wheel.

Skid speed reduction may be set to occur between an on and off condition (0 RPM and any non-zero RPM) or between a higher speed level and a lower speed level. In a more specific example, skid speed reduction may include the amount of reduction, for example, 75% of a higher base speed, like 2,000 RPM, to result in a lower skid speed of 500 RPM. In an exemplary embodiment, the 2,000 RPM base speed may correspond to about a 200 knot landing speed, and the 500 RPM skid speed may represent a speed at which a wheel rotates when skidding. Those of ordinary skill in the art will recognize that skid parameters are application specific, vehicle specific, and environmental condition specific, and may be determined via empirical studies, modeling, or in any other suitable manner. In any event, the presently disclosed device and method provide pulse trains that correspond to any desirable skid conditions.

Skid frequency may be set for a quantity of skids per unit of time. Skid duration may be set over an overall desired length of time for the simulated skid. Skid persistence may be set as a percentage of the skid period (i.e. the inverse of the skid frequency) that the wheel 22 is at skid speed. In other words, skid persistence is a time-based parameter like duty cycle wherein a user selects a length of time per cycle that the wheel 22 will be at the reduced, lower speed level. Therefore, the presently disclosed device and method provide a pulse mode in which skid parameters are variable to produce various pulse trains to emulate different skid conditions associated with different vehicles, tires, runway surface conditions, and/or the like.

In a specific example, the motion controller software allows a user to use a default pulse train to drive one or both of the motors at speeds between 2,000 RPM and 500 RPM, five times per second, for twenty seconds, with a skid persistence of 25% so that 75% of the skid duration occurs at the 2,000 RPM level. Of course, those of ordinary skill in the art will understand that the motion control software will allow the parameters to be adjusted for other desired parameter values. Also, the motion controller software allows a user to drive one of the other motors in the opposite direction and at a constant speed, for example, 1,052 RPM. This specific speed is merely an example that happens to correspond to approximately ninety knots ground speed for a thirty-four inch tire. In general, the constant speed may be representative of aircraft touch down protection thresholds or gain changes in flight controls or steering. Accordingly, the test device 24 can be coupled to and control multiple wheel rotation sensors to simulate a single wheel skid condition, wherein a sensor is rotated according to the pulse mode to simulate the single wheel skid condition and another sensor is rotated according to the velocity mode.

Figure 11:
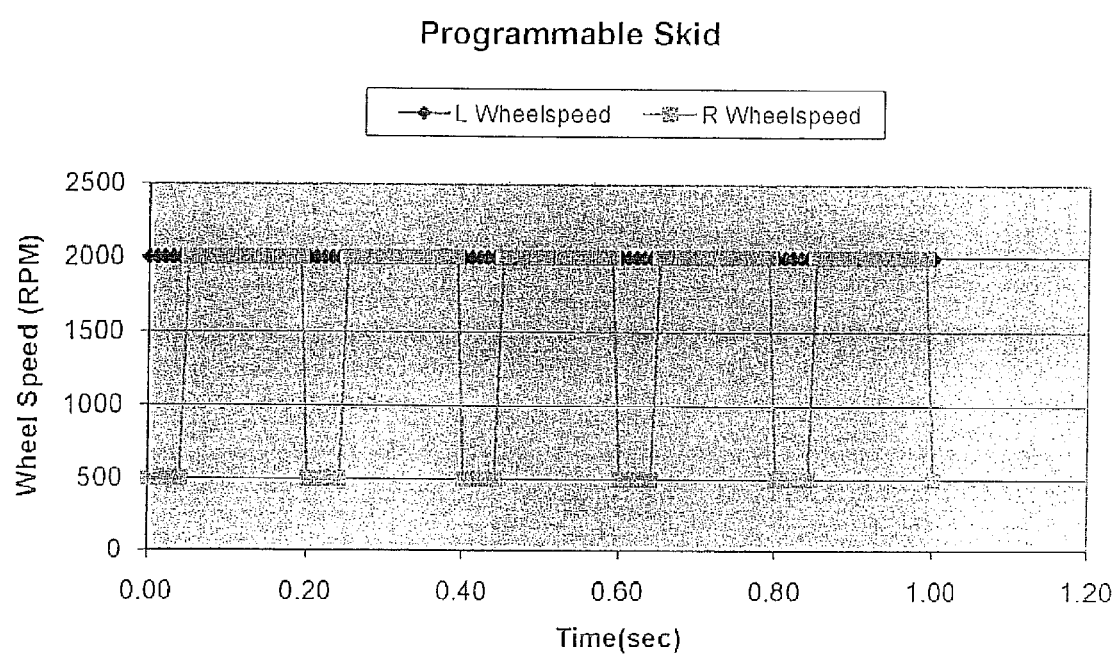
FIG. 11 is a graphical representation of an example waveform representative of a single wheel skid condition.

FIG. 11 illustrates an example waveform representative of a single wheel skid condition. The graph in FIG. 11 illustrates a left wheel speed at a constant 2,000 RPM and a right wheel skid between 500 RPM and 2,000 RPM over a one second interval.

In another embodiment, the test device 24 may be interfaced with one or more of the various controllers 40, 44, 46 or some vehicle system functional test computer. Accordingly, the test device 24 can be used during vehicle system functional testing to close a loop between wheel speed input on the one hand and system response output on the other hand.

The presently disclosed test devices 24, 224 may be used to carry out a method of simulating rotation of a wheel on a vehicle having a rotatable wheel rotation sensor. However, those of ordinary skill in the art will recognize that the method can be carried out using the test devices 24, 224, and/or any other suitable test device.

According to the method a motor is coupled to a rotatable portion of a wheel rotation sensor, and the motor is operated to rotate the rotatable portion of the rotation sensor according to a pulse train simulating a wheel skid. The pulse train may be defined by or generated in response to at least one of the following wheel skid parameters: skid speed reduction, skid frequency, skid duration, or skid persistence.

The method also may be used in conjunction with a method of testing vehicle system functionality, wherein wheel rotation is sensed using the rotatable wheel rotation sensor of the vehicle. For example, vehicle braking or steering systems or the like can be coupled to the wheel rotation sensor and can use output from the sensor when carrying out functional testing of such systems.

Accordingly, the presently disclosed device and method provides programmable rotation of one or more rotatable wheel rotation sensors to facilitate a variety of functional tests of a vehicle regardless of whether its wheels are rotating or stationary. Therefore, wheel rotation sensors and downstream controllers can be included in functional testing and, thus, more of a vehicle system can be included in functional testing of the vehicle system for increased reliability. According to one aspect of the present disclosure, however, the test device 24 is well suited to stimulate the wheel rotation sensors 34 with actual rotation when the wheel 22 is stationary. Therefore, the test device 24 can simulate rotation of the wheel 22 when the wheel 22 is stationary, and such simulated rotation can be sensed using the rotating wheel rotation sensors 34. Moreover, in contrast to previous vehicle testing, no electrical or hydraulic connections are disrupted so that the test device does not introduce external faults or mask existing faults in the vehicle system under test. Also, the presently disclosed device and method do not require equipment-intensive vehicle dynamometer rollers and also do not require spinning vehicle wheels at undesirably high speeds and skidding the wheels with undesirably high inertial forces. Furthermore, the presently disclosed device and method do not require vehicle road wheels to be jacked or supported of the ground in order to facilitate brake system functional testing.

This description, rather than describing limitations of an invention, only illustrates example embodiments of the invention recited in the claims. The language of this description is therefore exclusively descriptive and non-limiting. Obviously, it's possible to modify this invention from what the description teaches. Within the scope of the claims, one may practice the invention other than as described above.

What is claimed is:

1. A test device to simulate rotation of a wheel on a vehicle having a rotatable wheel rotation sensor, the device comprising:
   a motor coupleable to a rotatable portion of the rotation sensor; and
   a motion controller in communication with the motor to operate the motor to rotate the rotatable portion of the rotation sensor according to a pulse train simulating a wheel skid.

2. The test device of claim 1, further comprising a wheel hubcap adapter mountable to the vehicle wheel, wherein the motor is coupled to the adapter.

3. The test device of claim 2, wherein the motor includes an output shaft and the test device further comprises a drive coupling coupled to the output shaft and connectable to the rotatable portion of the rotation sensor when the adapter is mounted to the vehicle wheel.

4. The test device of claim 1, wherein the pulse train is defined by at least one of the following wheel skid parameters: skid speed reduction, skid frequency, skid duration, or skid persistence.

5. The test device of claim 1, wherein the motion controller is configured to operate the motor according to the pulse train, which pulses the motor between on or off, or between a lower speed and a higher speed.

6. The test device of claim 1, wherein the motion controller is configured to operate the motor according to a velocity mode that operates the motor to rotate the rotation sensor at a speed that simulates a desired wheel speed.

7. A test device to simulate rotation of a wheel on a vehicle having a rotatable wheel rotation sensor, the device comprising:
   a motor coupleable to a rotatable portion of the rotation sensor; and
   a motion controller in communication with the motor to operate the motor to rotate the rotatable portion of the rotation sensor according to a pulse train simulating a wheel skid, wherein the motion controller is configured to operate the motor according to a velocity mode that operates the motor to rotate the rotation sensor at a speed that simulates a desired wheel speed, and wherein the motion controller is configured to drive the motor at speeds suitable to test at least one of the following vehicle system functions: an aircraft maintenance mode, speed response of a speed-sensitive aircraft nose wheel steering system, or response of an aircraft braking system to brake application to simulate a rejected take off.

8. The test device of claim 1, wherein the motor is a brushless DC stepper motor.

9. The test device of claim 1, further comprising a computer having a motion control software application loaded thereto and being in communication with the controller to control motion of the motor.

10. The test device of claim 1, further comprising:
a wheel hubcap adapter mountable to the vehicle wheel, wherein the motor is coupled to the adapter and the motor includes an output shaft; and
a drive coupling coupled to the output shaft and connectable to the rotatable portion of the rotation sensor when the adapter is mounted to the vehicle wheel.

11. A test device to simulate rotation of a wheel on a vehicle having a rotatable wheel rotation sensor, the device comprising:
a motor coupleable to a rotatable portion of the rotation sensor;
a motion controller in communication with the motor to operate the motor to rotate the rotatable portion of the rotation sensor according to a pulse train simulating a wheel skid;
a wheel hubcap adapter mountable to the vehicle wheel, wherein the motor is coupled to the adapter and the motor includes an output shaft;
a drive coupling coupled to the output shaft and connectable to the rotatable portion of the rotation sensor when the adapter is mounted to the vehicle wheel; and
a protective housing including a case and a cover coupled to the case, and in which are disposed one or more components of the test device including the adapter, the motor, the drive coupling, the motion controller, a user interface, and a computing device in communication with the user interface and the motion controller and having a motion control software application loaded thereto, wherein the protective housing includes multiple compartments including an electrical compartment having an interface panel with an on/off switch, motor communication couplings, wherein the compartment also houses a transformer coupled to the on/off switch via a fuse, communication break out boxes coupled to the transformer and coupled downstream to a motor driver of the motion controller.

12. A method of simulating rotation of a wheel on a vehicle having a rotatable wheel rotation sensor, comprising:
coupling a motor to a rotatable portion of the rotation sensor; and
operating the motor to rotate the rotatable portion of the rotation sensor according to a pulse train simulating a wheel skid.

13. The method of claim 12, wherein the pulse train is defined by at least one of the following wheel skid parameters: skid speed reduction, skid frequency, skid duration, or skid persistence.

14. The method of claim 12 used to facilitate a vehicle system functional test, which includes sensing wheel rotation using the rotatable wheel rotation sensor of the vehicle.

15. The method of claim 12, wherein the motor operating step includes generating the pulse train to pulse the motor between on and off or between a lower speed and a higher speed for testing anti-skid functionality of a vehicle braking system.

16. The method of claim 12, wherein the motor operating step includes operating the motor according to a velocity mode in which the motor is driven to impart a desired simulated wheel speed input.

17. A method of simulating rotation of a wheel on a vehicle having a rotatable wheel rotation sensor, comprising:
coupling a motor to a rotatable portion of the rotation sensor; and
operating the motor to rotate the rotatable portion of the rotation sensor according to a pulse train simulating a wheel skid, wherein the motor operating step includes operating the motor according to a velocity mode in which the motor is driven to impart a desired simulated wheel speed input, and wherein the motor operating step includes driving the motor in one of a fixed or variable manner to impart a desired simulated wheel speed input for testing at least one of an aircraft maintenance mode, speed-sensitive aircraft nose wheel steering, or response of an aircraft braking system to brake application to simulate a rejected take off.

18. A method of simulating rotation of wheels on a vehicle having rotatable wheel rotation sensors, comprising:
coupling motors to rotatable portions of the rotation sensors;
operating at least one of the motors to rotate at least one of the rotatable portions of at least one of the rotation sensors according to a velocity mode; and
operating another of the motors to rotate another of the rotatable portions of another of the rotation sensors according to a pulse train simulating a single wheel skid.

19. A method of testing vehicle system functionality, comprising:
coupling a motor to a rotatable portion of a vehicle wheel rotation sensor; and
operating the motor to rotate the rotatable portion of the rotation sensor according to a pulse train simulating a wheel skid; and
sensing wheel rotation using the rotation sensor.

* * * * *